United States Patent
Murakami (10) Patent No.: US 10,103,611 B2
(45) Date of Patent: Oct. 16, 2018

(54) MACHINE LEARNING APPARATUS AND METHOD FOR LEARNING ARRANGEMENT POSITION OF MAGNET IN ROTOR AND ROTOR DESIGN APPARATUS INCLUDING MACHINE LEARNING APPARATUS

(71) Applicant: FANUC CORPORATION, Yamanashi (JP)

(72) Inventor: Yoshinori Murakami, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 75 days.

(21) Appl. No.: 15/277,988

(22) Filed: Sep. 27, 2016

(65) Prior Publication Data

US 2017/0093256 A1    Mar. 30, 2017

(30) Foreign Application Priority Data

Sep. 30, 2015  (JP) ................... 2015-193647

(51) Int. Cl.
  *H02K 15/03* (2006.01)
  *H02K 1/27* (2006.01)

(52) U.S. Cl.
  CPC ............. *H02K 15/03* (2013.01); *H02K 1/278* (2013.01)

(58) Field of Classification Search
  CPC ....................................................... H02K 15/03
  USPC .................................................. 318/638, 560
  See application file for complete search history.

(56) References Cited

U.S. PATENT DOCUMENTS

| | | | |
|---|---|---|---|
| 5,773,908 A | * | 6/1998 | Stephens ............... H02K 1/146 310/156.47 |
| 2011/0037339 A1 | | 2/2011 | Rahman et al. |
| 2011/0192018 A1 | | 8/2011 | Miyata |
| 2012/0119506 A1 | | 5/2012 | Andersen et al. |

FOREIGN PATENT DOCUMENTS

| | | |
|---|---|---|
| CN | 1388623 A | 1/2003 |
| CN | 101888162 A | 11/2010 |
| JP | 3-248672 A | 11/1991 |
| JP | H5-326195 A | 12/1993 |
| JP | 10-210718 A | 8/1998 |

(Continued)

OTHER PUBLICATIONS

K. Zhang, "Study of the Cogging Torque in Permanent Magnet Machines", Jun. 2011, Henan Polytechnic University, China, 71 pp.

(Continued)

*Primary Examiner* — David S Luo
(74) *Attorney, Agent, or Firm* — Hauptman Ham, LLP (57) ABSTRACT

A machine learning apparatus, which learns a condition associated with arrangement positions of magnets on a core of a motor rotor, includes: a state observation unit that observes a state variable composed of data relating to arrangement positions of a plurality of the magnets arranged on the core, data relating to a magnitude of cogging torque generated when the plurality of magnets are arranged at the respective arrangement positions, and data relating to a magnetic flux density of each of the magnets; and a learning unit that learns the condition associated with the arrangement positions of the magnets on the core in accordance with a training data set constituted by the state variable.

9 Claims, 8 Drawing Sheets

(56) References Cited

FOREIGN PATENT DOCUMENTS

| JP | 2003-141186 A | 5/2003 |
|---|---|---|
| JP | 2004-178492 A | 6/2004 |
| JP | 2010-233325 A | 10/2010 |
| JP | 2012-70622 A | 4/2012 |
| JP | 2013-225192 A | 10/2013 |
| JP | 2014-31298 A | 2/2014 |
| JP | 2014-206795 A | 10/2014 |

OTHER PUBLICATIONS

Liu Ting, "The Study for Reducing Cogging Torque in Surface Mounted Permanent Magnet Synchronous Machine", Mar. 2013, Electrical Engineering, Graduate School of Hunan University, China, 135 pp.

Chen Zhenfei, "Modeling Analyzing and Designing of Surface-Mounted Permanent-Magnet Synchronous Machines", Jun. 2014, School of Electrical and Information Engineering, Tianjin University, China, 118 pp.

\* cited by examiner

MACHINE LEARNING APPARATUS AND METHOD FOR LEARNING ARRANGEMENT POSITION OF MAGNET IN ROTOR AND ROTOR DESIGN APPARATUS INCLUDING MACHINE LEARNING APPARATUS

RELATED APPLICATIONS

The present application claims priority to Japanese Patent Application Number 2015-193647 filed Sep. 30, 2015, the disclosure of which is hereby incorporated by reference herein in its entirety.

BACKGROUND OF THE INVENTION

1. Field of the Invention

The present invention relates to a machine learning apparatus and method for learning an arrangement position of a magnet in a motor rotor, and a rotor design apparatus including the machine learning apparatus.

2. Description of the Related Art

Figure 11:
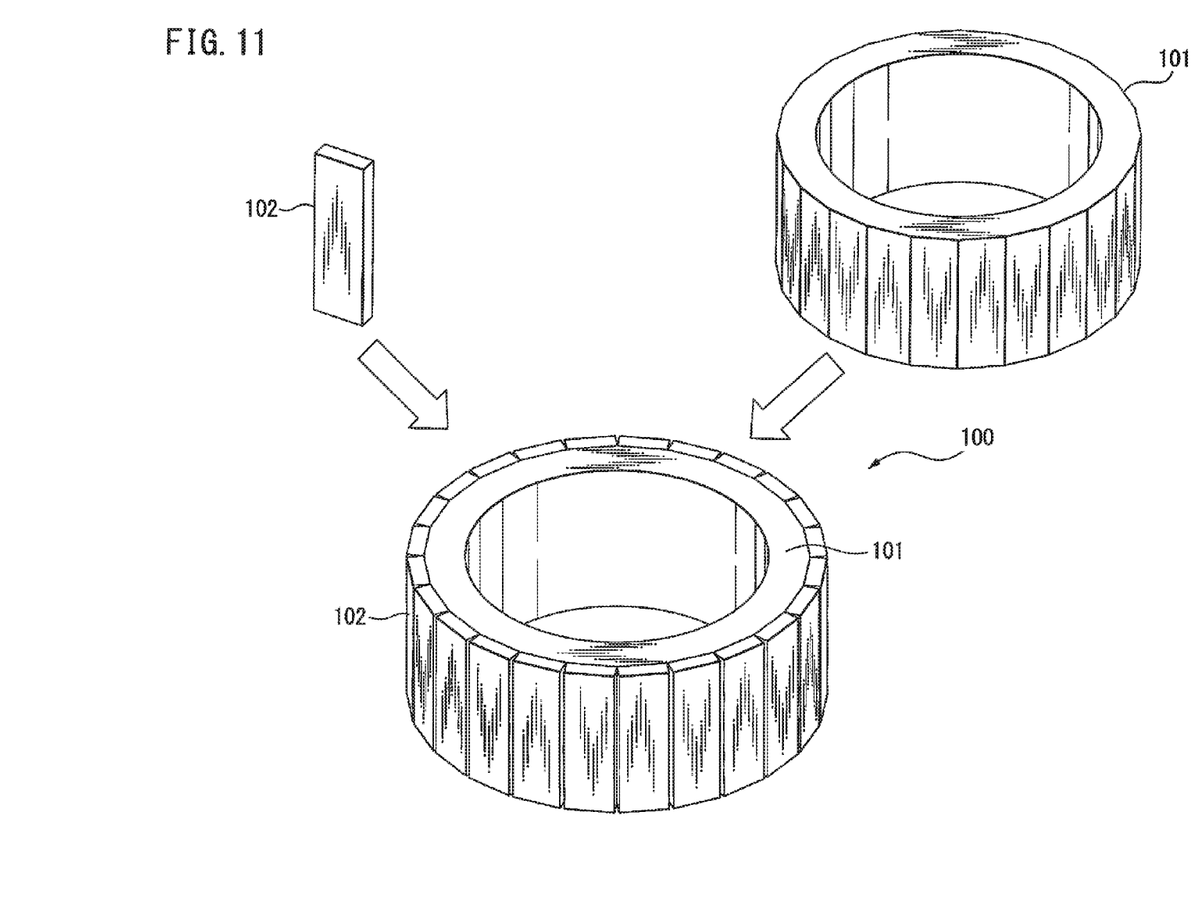
FIG. 11 is a schematic view explaining assemblage of a rotor of a general synchronous motor.

FIG. 11 is a schematic view explaining assemblage a rotor of a general synchronous motor. For example, as described in Japanese Laid-open Patent Publication No. 2010-233325, a rotor 100 of a synchronous motor is formed such that a plurality of magnets 102 are arranged on a circumferential surface of a core 101.

Since each of the magnets arranged on the core forming the rotor has a variation in magnetic flux density, cogging torque varies depending on how the magnets are arranged on the core (arrangement position). In other words, the smoothness of feed of the rotor assembled (cogging torque) may sometimes deteriorate depending on the arrangement positions of the magnets.

Conventionally, there is a method for optimizing the smoothness of feed by adding a component for adjusting the magnetic flux density of each individual magnet when a variation in the magnetic flux density of each individual magnet is taken into account during assembly of a rotor, as in Japanese Laid-open Patent Publication No. 2010-233325. However, there is a problem in that due to the addition of the component, the cost is increased, and time is required for adjustment.

Further, the relationship between cogging torque (smoothness of feed) and arrangement positions of magnets can be simulated by commercially available analysis software. However, for example, when n pieces of magnets (where n is a natural number) are arranged on a core, there are "n!" (i.e., factorial of n) orders of arrangement of the magnets. It is unrealistic and virtually difficult to measure the magnetic flux density of each of n pieces of magnets and then perform a simulation analysis of the magnitude of cogging torque for all "n!" arrangement patterns of the magnets, thereby determining the arrangement positions of the magnets for which the magnitude of cogging torque is minimized (the smoothness of feed of the rotor is optimized).

SUMMARY OF THE INVENTION

An object of the present invention is to provide a machine learning apparatus and method capable of easily determining optimum arrangement positions of magnets on a core of a motor rotor, and a rotor design apparatus including the machine learning apparatus, in view of the problems described above.

In order to achieve the above object, the machine learning apparatus, which learns a condition associated with the arrangement positions of the magnets on the core of the motor rotor, includes: a state observation unit that observes a state variable composed of data relating to arrangement positions of a plurality of the magnets arranged on the core, data relating to a magnitude of cogging torque generated when the plurality of magnets are arranged at the respective arrangement positions, and data relating to the magnetic flux density of each of the magnets; and a learning unit that learns the condition associated with the arrangement positions of the magnets on the core in accordance with a training data set constituted by the state variable.

The learning unit may include: a reward calculation unit that calculates a reward based on the magnitude of the cogging torque generated when the plurality of magnets are arranged at certain arrangement positions on the core; and function update unit that updates a function for calculating the arrangement positions of the magnets on the core based on the state variable and the reward.

The reward calculation unit may be configured to increase the reward when the magnitude of the cogging torque generated when the plurality of magnets are arranged at certain arrangement positions on the core is smaller than the magnitude of the cogging torque observed by the state observation unit before the magnitude of the current cogging torque, and to reduce the reward when larger.

Further, the reward calculation unit may be configured to increase the reward when the magnitude of the cogging torque generated when the plurality of magnets are arranged at certain arrangement positions on the core is inside a specified range, and to reduce the reward when the magnitude is outside the specified range.

Further, the function update unit may be configured to update the function for calculating the arrangement positions of the magnets on the core, based on the state variable and the reward and in accordance with a neural network model.

Further, the learning unit may be configured to learn the above condition in accordance with a training data set created with respect to a plurality of rotors.

The rotor design apparatus including the above-described machine learning apparatus further includes: an input unit to which data relating to the magnetic flux density of each magnet is inputted; a cogging torque calculation unit that calculates a magnitude of cogging torque generated when a plurality of magnets are arranged at arrangement positions on a core, based on the data relation to the magnetic flux density of each magnet inputted via the input unit; a decision-making unit that determines the arrangement positions of the magnets on the core based on a result learned by the learning unit in accordance with the training data set and in response to input of a current state variable; and a notification unit that notifies the arrangement positions of the magnets determined by the decision-making unit.

Further, the rotor design apparatus may be configured to further include a data storage unit that stores data relating to the magnetic flux densities of the in-stock magnets which exist more than the number of the magnets used to assemble a certain rotor; the decision-making unit may be configured to determine a combination and arrangement positions of magnets used in configuration of each rotor for which the magnitude of cogging torque generated by the magnets arranged on the core from among the in-stock magnets is minimized for each rotor, based on a result learned by the learning unit in accordance with the training data set including the data relating to the magnetic flux densities of the in-stock magnets stored in the data storage unit; and the notification unit may be configured to notify the combination and the arrangement positions of the magnets determined by the decision-making unit.

Further, the machine learning method for learning a condition associated with arrangement positions of magnets on a core of a motor rotor includes: a state observation step that observes a state variable composed of data relating to arrangement positions of a plurality of magnets arranged on the core, data relating to a magnitude of cogging torque generated when the plurality of magnets are arranged at the respective arrangement positions, and data relating to the magnetic flux density of each magnet; and a learning step that learns the condition associated with the arrangement positions of the magnets on the core in accordance with a training data set constituted by the state variable.

BRIEF DESCRIPTION OF THE DRAWINGS

The present invention will be more clearly understood by referring to the following accompanying drawings.

DETAILED DESCRIPTION

A machine learning apparatus and method that learn an arrangement position of a magnet on a rotor, and a rotor design apparatus including the machine learning apparatus will be described below with reference to the drawings. However, it should be understood that the present invention is not limited to the drawings or embodiments described below.

Figure 1:
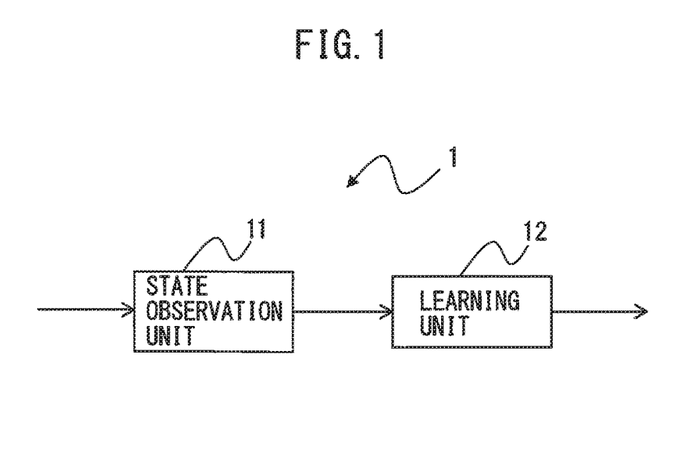
FIG. 1 is a principle block diagram of a machine learning apparatus according to an embodiment.

FIG. 1 is a principle block diagram of a machine learning apparatus according to an embodiment. Hereinafter, it is meant that components assigned identical reference numerals in different drawings are those having identical functions.

A rotor of a synchronous motor is formed such that a plurality of magnets are arranged on a core, and the machine learning apparatus 1 according to the embodiment is configured to learn arrangement positions of the magnets on the core of the rotor of the motor. The present invention is applicable to any motor (synchronous motor) in which magnets are used with the rotor and also to a surface-attached (SPM) motor in which magnets are attached to the rotor surface and a buried type (IPM) motor in which magnets are buried in the rotor.

The machine learning apparatus 1 includes a state observation unit 11 and a learning unit 12.

The state observation unit 11 observes a state variable composed from data relating to arrangement positions of a plurality of magnets arranged on a core, data relating to a magnitude of a cogging torque generated when the plurality of magnets are arranged at the arrangement positions, and data relating to a magnetic flux density of each magnet.

Figure 2:
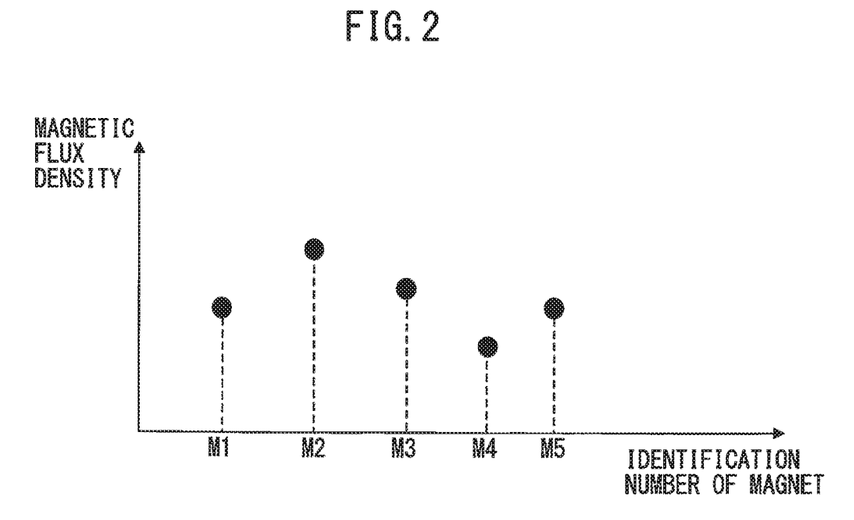
FIG. 2 is a view illustrating a magnetic flux density of a magnet.

When a plurality of magnets are arranged on a core, there are a plurality of patterns in the order of arranging the magnets, and the magnitude of cogging torque for each pattern is computed by a computer using a well-known analysis software. Further, FIG. 2 is a view illustrating magnetic flux density of magnets. There is variation in magnetic flux density for the individual magnets arranged on a core forming a rotor, and in the present embodiment, the magnetic flux density for each magnet is measured beforehand and databased in association with an identification number (in the illustrated example, M1 to M5).

The learning unit 12 learns arrangement position of the magnets on the core in accordance with a training data set constituted by a state variable. Further, a training data set may be acquired for a case where there is a plurality of rotors; in such a case, the learning unit 12 learns the arrangement positions of the magnets on the core in accordance with the training data set created for the plurality of rotors. Incidentally, the learning unit 12 may learn the arrangement positions of the magnets on the core based on a result learned by a learning unit in a machine learning apparatus separate from the machine learning apparatus 1 provided with the learning unit 12.

Figure 3:
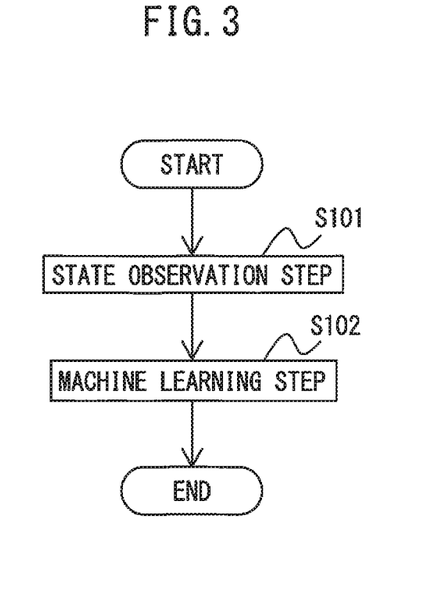
FIG. 3 is a flow chart illustrating an operation flow of a machine learning method according to an embodiment.

FIG. 3 is a flow chart illustrating an operation flow of the machine learning method according to the embodiment. The machine learning method for learning a condition associated with the arrangement positions of the magnets on the rotor of the motor includes a state observation step S101 and a learning step S102.

The state observation step S101 is performed by the state observation unit 11, and, i.e., it observes a state variable composed of data relating to arrangement positions of a plurality of magnets arranged on a core, data relating to a magnitude of cogging torque generated when the plurality of magnets are arranged at the arrangement positions, and data relating to a magnetic flux density of each magnet.

The learning step S102 is performed by the learning unit 12, and, i.e., it learns the arrangement positions of the magnets on the core in accordance with a training data set constituted by the state variable.

The machine learning apparatus 1 may use any learning algorithm. The machine learning apparatus 1 has functions of analytically extracting, from a set of data inputted to the apparatus, a useful rule, a knowledge representation, a criterion for judgment or the like contained therein, outputting a result of the judgment, and performing learning knowledge learning. The technique is various, and is broadly classified as "supervised learning", "unsupervised learning" or "reinforcement learning". Further, there is a technique referred to as "deep learning" that learns extraction of a feature value in order to realize these techniques. Hereinafter, by way of example, description will be made of a case in which use reinforcement learning with reference to FIGS. 4 and 5. With respect to "supervised learning" and "unsupervised learning", description will be made hereinafter.

Figure 4:
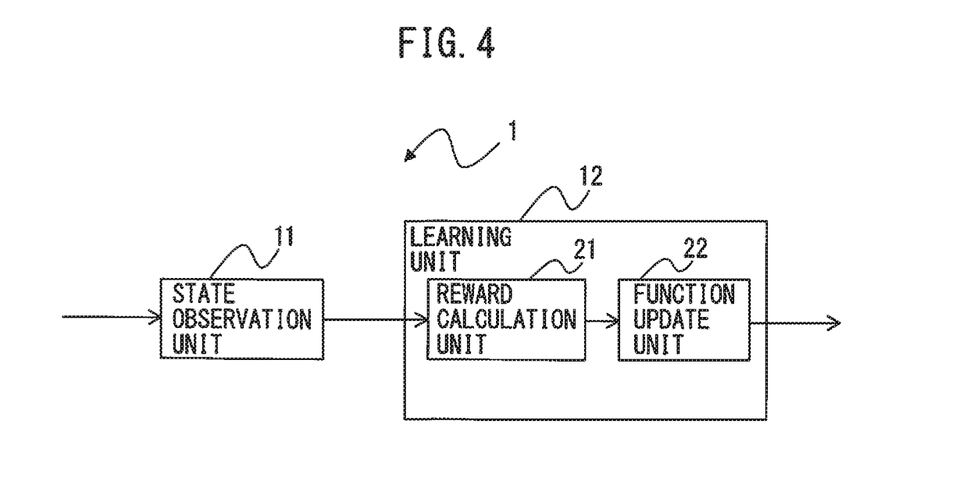
FIG. 4 is a principle block diagram of a machine learning apparatus using reinforcement learning according to an embodiment.

FIG. 4 is a principle block diagram of the machine learning apparatus using reinforcement learning according to the embodiment. The learning unit 12 includes a reward calculation unit 21 and a function update unit 22. Also, components other than the reward calculation unit 21 and the function update unit 22 are similar to the components illustrated in FIG. 1; therefore, identical components are assigned identical reference numerals, and a detailed description thereof is omitted.

The reward calculation unit 21 calculates a reward based on a magnitude of cogging torque generated when the plurality of magnets are arranged at certain arrangement positions on the core. In other words, the smaller the magnitude of the cogging torque, the higher the reward which the reward calculation unit 21 provides while recognizing that the arrangement positions of the magnets on the core have a more favorable influence. For example, the reward calculation unit 21 may be configured to increase the reward when the magnitude of the cogging torque generated when the plurality of magnets are arranged at certain arrangement positions on the core is smaller than the magnitude of the cogging torque observed by the state observation unit 11 before the magnitude of the current cogging torque, and to reduce the reward when larger. Further, for example, the reward calculation unit 21 may be configured to increase the reward when the magnitude of the cogging torque generated when the plurality of magnets are arranged at certain arrangement positions on the core is inside a specified range, and to reduce the reward when the magnitude is outside the specified range.

The function update unit 22 updates a function (action value table) for calculating the arrangement positions of the magnets on the core, based on the state variable observed by the state observation unit 11 and the reward calculated by the reward calculation unit 21. A method for updating the function (action value table) will be described hereinafter.

Figure 10:
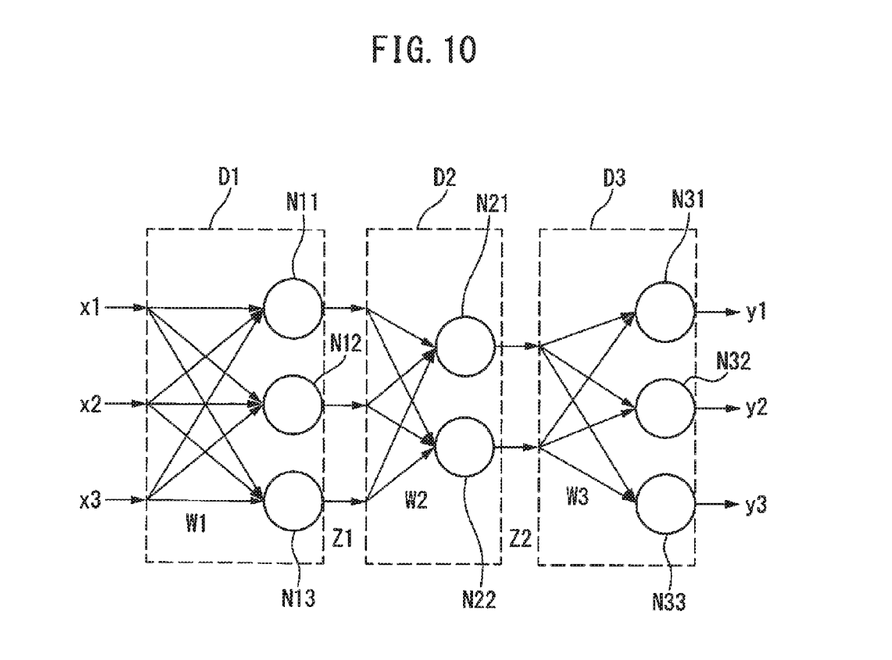
FIG. 10 is a schematic diagram illustrating a neural network having weights of three layers D1 to D3.

The learning unit 12 may calculate, in a multilayered structure, the state variable observed by the state observation unit 11 and update the function (action value table) in real time. For example, the function update unit 22 may be configured to update the function for calculating the arrangement positions of the magnets on the core, based on the state variable observed by the state observation unit 11 and the reward calculated by the reward calculation unit 21 and in accordance with a neural network model. As a method for calculating the state variable in a multilayered structure, it is possible, for example, to use a multilayered neural network such as illustrated in FIG. 10 described hereinafter.

Figure 5:
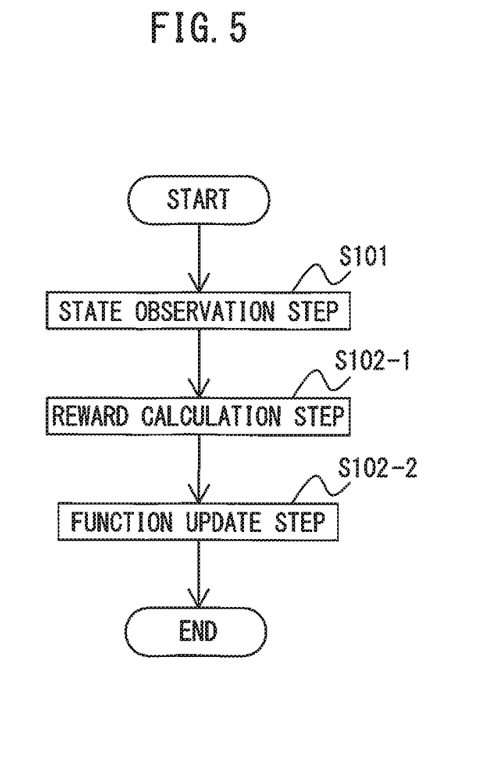
FIG. 5 is a flow chart illustrating an operation flow of a machine learning method using reinforcement learning according to an embodiment.

FIG. 5 is a flow chart illustrating an operation flow of the machine learning method using reinforcement learning according to an embodiment.

First, at state observation step S101, the state observation unit 11 observes a state variable composed of data relating to the arrangement positions of the plurality of magnets arranged on the core, data relating to the magnitude of cogging torque generated when the plurality of magnets are arranged at the arrangement positions, and data relating to the magnetic flux density of each magnet.

Then, at reward calculation step S102-1, the reward calculation unit 21 calculates a reward based on the magnitude of cogging torque generated when the plurality of magnets are arranged at certain arrangement positions on the core.

Then, at function update step S102-2, the function update unit 22 updates the function (action value table) for calculating the arrangement positions of the magnets on the core, based on the state variable observed by the state observation unit 11 and the reward calculated by the reward calculation unit 21.

Subsequently, description will be made of a rotor design apparatus including the above-described machine learning apparatus.

Figure 6:
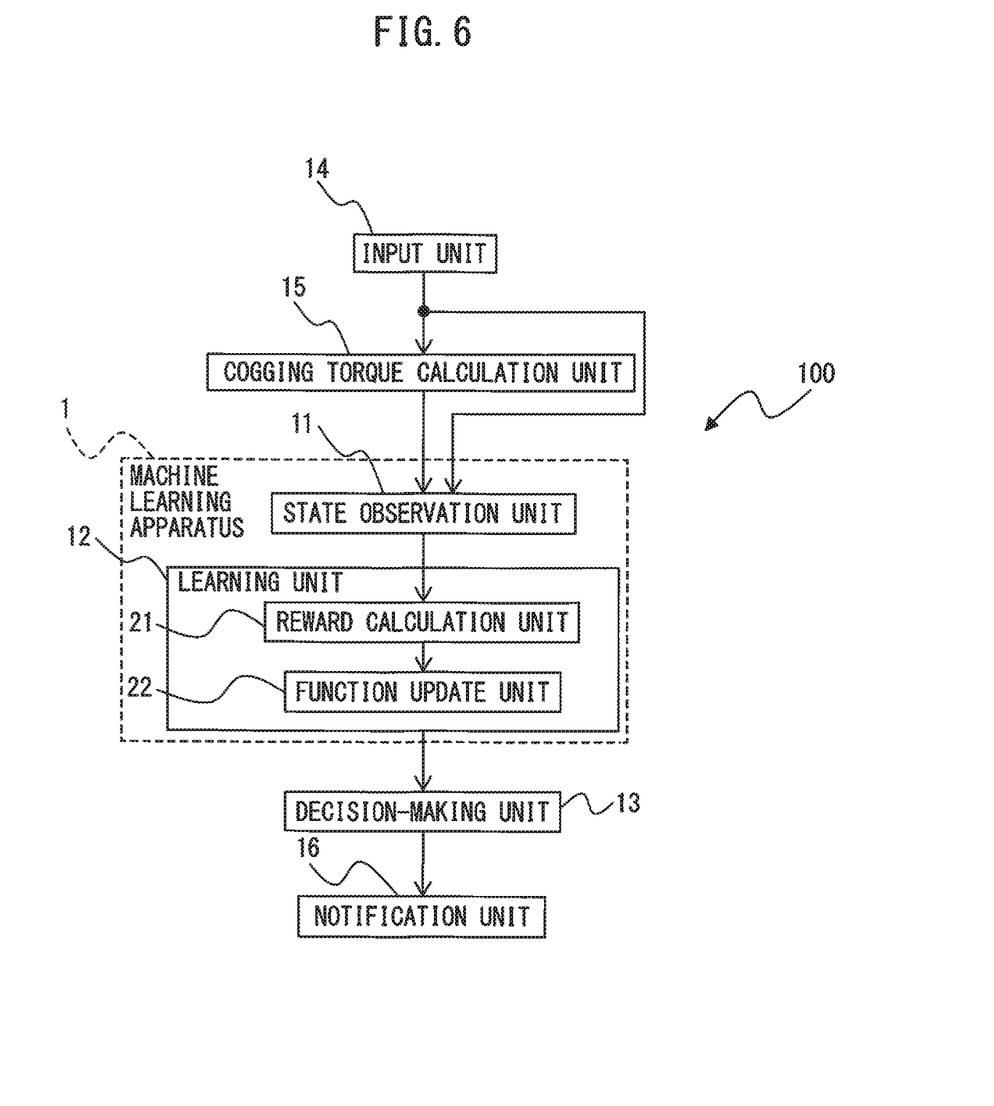
FIG. 6 is a principle block diagram illustrating a rotor design apparatus including the machine learning apparatus according to an embodiment.

FIG. 6 is a principle block diagram illustrating the rotor design apparatus including the machine learning apparatus according to an embodiment.

The rotor design apparatus 100 according to the embodiment includes the above-described machine learning apparatus 1, a decision-making unit 13, an input unit 14, a cogging torque calculation unit 15, and a notification unit 16.

The input unit 14 is one by which data relating to the measured magnetic flux density of each magnet is inputted, and may, for example, include a keyboard, mouse, touch panel and so forth, which are accessories of a computer (not illustrated). Further, alternatively, the input unit 14 may be one by which data outputted from a measurement apparatus (not illustrated) that measures the magnetic flux density of the magnet is directly inputted via a wired cable or via wireless communication. The inputted data relating to the magnetic flux density is stored in a storage device (not illustrated) in association with the identification number of each magnet, and used for processing in a subsequent cogging torque calculation unit 15.

The cogging torque calculation unit 15 calculates the magnitude of the cogging torque generated when the plurality of magnets are arranged at certain arrangement positions on the core, based on the data relating to the magnetic flux density of each magnet inputted via the input unit 14. The data relating to the magnitude of the cogging torque for each arrangement position calculated by the cogging torque calculation unit 15 is inputted to the state observation unit 11 in the machine learning apparatus 1. The more the variation in the arrangement position of the magnet for which the magnitude of the cogging torque is calculated, the more enhanced is the accuracy of learning result. For example, when the number of the magnets is n (where n is a natural number), there are "n! (i.e., factorial of n)" arrangement position patterns (orders of arrangement) of the magnets.

The machine learning apparatus 1 in the rotor design apparatus 100 includes the state observation unit 11 and the learning unit 12 as described above.

The state observation unit 11 observes a state variable composed of data relating to arrangement positions of the plurality of magnets arranged on the core inputted from the cogging torque calculation unit 15, data relating to the magnitude of cogging torque generated when the plurality of magnets are arranged at the respective arrangement positions, and data relating to the magnetic flux density of each magnet inputted from the input unit 14.

The reward calculation unit 21 in the learning unit 12 calculates a reward based on the magnitude of cogging torque generated when the plurality of magnets are arranged at certain arrangement positions on the core. For example, the reward calculation unit 21 increases the reward when the magnitude of the cogging torque generated when the plurality of magnets are arranged at certain arrangement positions on the core is smaller than the magnitude of the cogging torque observed by the state observation unit 11 before the magnitude of the current cogging torque, and reduces the reward when larger. Further, for example, the reward calculation unit 21 increases the reward when the magnitude of cogging torque generated when the plurality of magnets are arranged at certain arrangement positions on the core is inside a specified range, and reduces the reward when the magnitude is outside the specified range.

The function update unit 22 in the learning unit 12 updates the function (action value table) for calculating the arrangement position of the magnet on the core based on the state variable observed by the state observation unit 11 and the reward calculated by the reward calculation unit 21.

The decision-making unit 13 determines the arrangement positions of the magnets on the core based on a result learned by the learning unit 12 in accordance with a training data set and in response to input of a current state variable. In the present embodiment, since, by way of example, reinforcement learning is used as a learning algorithm, the function update unit 22 in the learning unit 12 updates, based on the reward calculated by the reward calculation unit 21 in the learning unit 12, the function for calculating the arrangement positions of the magnets on the core, and the decision-making unit 13 selects, based on the updated function, the arrangement position of the magnet for which the highest reward is obtained.

The notification unit 16 is to notify the operator of the arrangement positions of the magnets determined by the decision-making unit 13, for which the highest reward is obtained. The notification unit 16 may for example be a display of a computer, portable terminal or touch panel or the like, and in this instance, the determined arrangement position is represented in a character format listing the identification numbers of the magnets or in a drawing format. Alternatively, the notification unit 16 may be implemented by an audio device that emits a sound, such as speaker, buzzer or chime, and in this instance, notifies the operator of the determined arrangement position with a sound representing the identification number of the magnet or a number of times of the buzzer or chime sound. Further alternatively, the notification unit 16 may take a form in which what is printed on a paper surface or the like by a printer is notified to the operator. Further alternatively, the notification unit may be implemented by combining them as appropriate.

Figure 7:
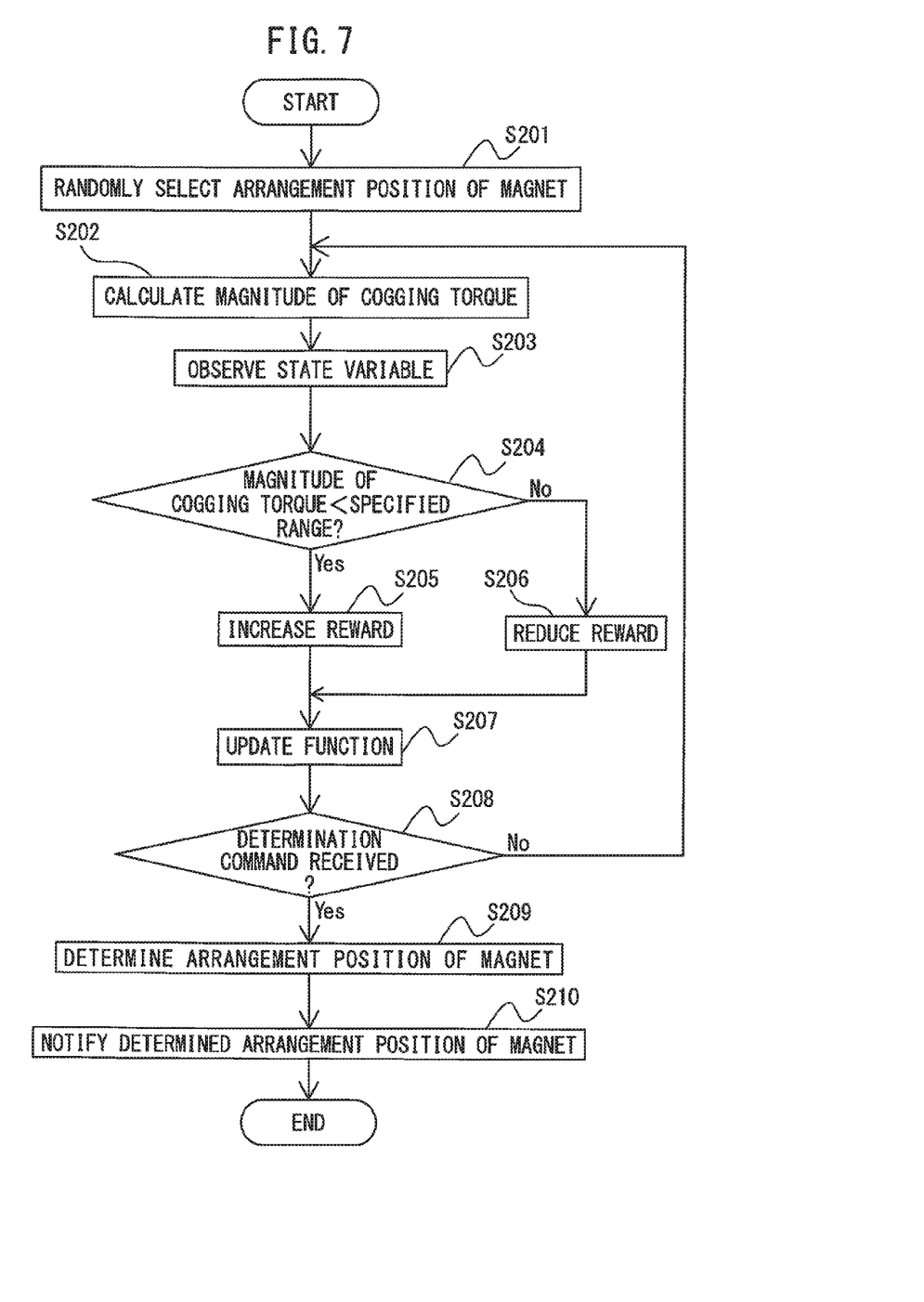
FIG. 7 is a flow chart illustrating an operation flow of the rotor design apparatus including the machine learning apparatus according to the embodiment.

FIG. 7 is a flow chart illustrating an operation flow of the rotor design apparatus including the machine learning apparatus according to an embodiment.

Generally, in reinforcement learning, the initial value of action is randomly selected. In the present embodiment, at step S201, the arrangement position (arrangement order) of the magnet on the core which is action is randomly selected.

At step S202, the cogging torque calculation unit 15 calculates the magnitude of a cogging torque generated when the plurality of magnets are arranged on the core, based on data relating to the magnetic flux density of each magnet which is inputted via the input unit 14.

At step S203, the state observation unit 11 observes a state variable composed of data relating to the arrangement positions of the plurality of magnets arranged on the core which are inputted from the cogging torque calculation unit 15, data relating to the magnitude of cogging torque generated when the plurality of magnets are arranged at the respective arrangement positions, and data relating to the magnetic flux density of each magnet which is inputted from the input unit 14.

At step S204, the state observation unit 11 determines whether the magnitude of the cogging torque generated when the plurality of magnets are arranged at certain arrangement positions on the core is inside a specified range. When it is determined by the state observation unit 11 that the magnitude of the cogging torque generated when the plurality of magnets are arranged at certain arrangement positions on the core is inside the specified range, the reward calculation unit 21 increases the reward at step S205. In contrast, when it is determined by the state observation unit 11 that the magnitude of the cogging torque is outside the specified range, the reward calculation unit 21 reduces the reward at step S206. The specified range may be set as appropriate by the operator, taking into account of various factors, such as the manufacturing cost of the rotor, the use environment, or the like. Although, in the example illustrated in FIG. 7, it is configured such that the reward calculation unit 21 increases the reward when the magnitude of the cogging torque generated when the plurality of magnets are arranged at certain arrangement positions on the core is inside the specified range and reduces the reward when the magnitude is outside the specified range, it may alternatively be configured such that the reward calculation unit 21 increases the reward when the magnitude of cogging torque generated when the plurality of magnets are arranged at certain arrangement positions on the core is smaller than the magnitude of cogging torque observed by the state observation unit 11 before the magnitude of the current cogging torque and reduces the reward when larger.

At step S207, the function update unit 22 updates the function for calculating the arrangement positions of the magnets on the core, based on the state variable observed by the state observation unit 11 and the reward calculated by the reward calculation unit 21.

At step S208, the decision-making unit 13 determines whether a determination command is received for commanding determination of the arrangement positions of the magnets. The determination command is input to the decision-making unit 13 via an input device, for example, with a timing such that the operator desires to output the result of learning by the machine learning apparatus 1. When the decision-making unit 13 determines at step S208 that the determination command is not received, the process returns to step S202. When it is determined that the determination command is received, the process proceeds to step S209. Incidentally, although, in the example illustrated in FIG. 7, based on whether or not the determination command is received, the decision-making unit 13 determines whether to determine the arrangement positions of the magnets or to continue the machine learning process, the decision-making unit 13 may alternatively determine whether to determine the arrangement positions of the magnets or to continue the machine learning process, based on whether or not the cogging torque calculation unit 15 calculates the magnitude of the cogging torque for all arrangement patterns. In this instance, when the decision-making unit 13 determines that the cogging torque calculation unit 15 has calculated the magnitude of the cogging torque for all arrangement patterns, the process proceeds to step S209. Due to the processes of steps S202 to S208 being performed repetitively, the machine learning apparatus 1 proceeds to learn optimum arrangement positions of the magnet for which the cogging torque is minimized. Incidentally, the training data set may be obtained for a case in which there are a plurality of rotors, and in such an instance, the learning unit 12 performs the processes of steps S201 to S208 repetitively in accordance with the training data set creased with respect to the plurality of rotors, and proceeds to learn the arrangement positions of the magnets on the core. Upon the training data set being obtained with respect to the plurality of rotors, the learning accuracy of the machine learning apparatus 1 is improved.

At step S209, the decision-making unit 13 extracts (selects) the arrangement position of the magnets for which the highest reward is obtained, based on the function updated at step S207.

At subsequent step S210, the notification unit 16 notifies the operator of the arrangement position of the magnets determined at step S209 for which the highest reward is obtained.

Figure 8:
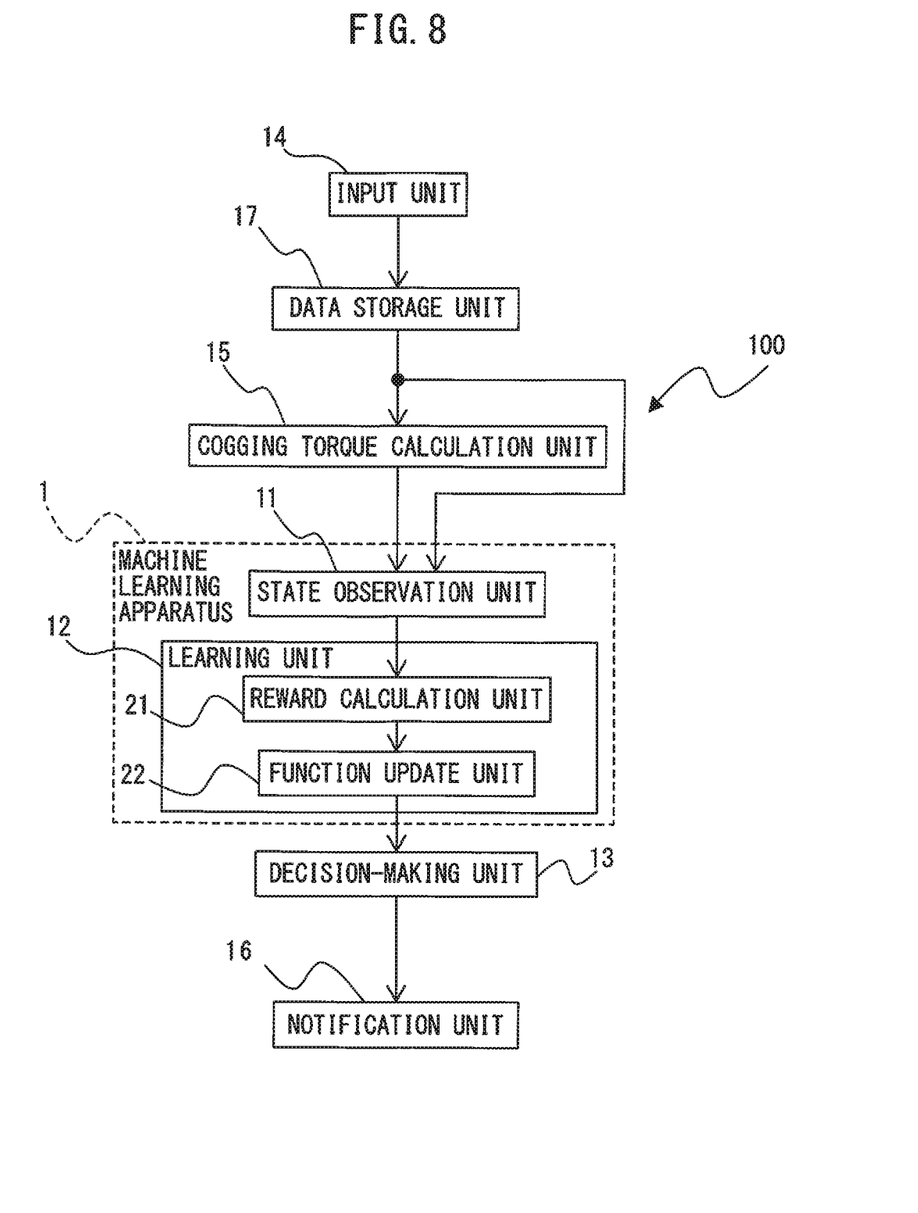
FIG. 8 is a principle block diagram illustrating a rotor design apparatus including the machine learning apparatus according to a modification of the embodiment.

By way of modified example of the above-described rotor design apparatus, in a case in which there is provided a stock of magnets, the number of which is more than the number of magnets used for assembling one rotor, the rotor design apparatus may be configured to select magnets for forming a plurality of rotors from the stock of magnets (hereinafter, referred to sometimes as "in-stock magnets") such that the magnitude of the generated cogging torque becomes small on average, instead of becoming irregularly large or small, with respect to each of the assembled rotors. FIG. 8 is a principle block diagram illustrating the rotor design apparatus including the machine learning apparatus according to a modification of an embodiment. In the present modified embodiment, the rotor design apparatus 100 illustrated in FIG. 6 further includes a data storage unit 17 that stores data relating to the magnetic flux densities of the in-stock magnets which exist more than the number of the magnets used to assemble a certain rotor.

The data relating to the pre-measured magnetic flux densities of the in-stock magnets are inputted via the input unit 14, and stored in the data storage unit 17 in association with the identification numbers of the respective in-stock magnets. The cogging torque calculation unit 15 calculates the magnitudes of cogging torques for a variety of arrangement position patterns of the in-stock magnets based on the data relating to the magnetic flux densities of the in-stock magnets stored in the data storage unit 17. The decision-making unit 13 determines such a combination and arrangement positions of magnets used to configure each rotor that the magnitudes of cogging torques generated by the magnets arranged on the core from among the in-stock magnets become minimum with respect to the respective rotors, based on a result learned by the learning unit 12 in accordance with a data set including data relating to the magnetic flux densities of the in-stock magnets stored in the data storage unit 17. The notification unit 16 notifies the combination and arrangement positions of the magnets determined by the decision-making unit 13. Also, since components other than those and operations thereof are similar to what has been described above with respect to FIGS. 7 and 8, identical components are assigned identical reference numerals, and a detailed description of such components is omitted.

According to the present modified embodiment, when a plurality of rotors are manufactured using the numerous in-stock magnets, variations in the magnitude of cogging torque of a rotor due to differences in the production lot can be suppressed, and as a whole, the magnitude of the cogging torque can be reduced, so that economic performance is improved.

A more detailed description is made of the machine learning apparatus 1. The machine learning apparatus 1 has functions of analytically extracting, from a set of data inputted to the apparatus, a useful rule, a knowledge representation, a criterion for judgment or the like contained therein, outputting a result of the judgment, and performing learning knowledge learning. The technique is various, and is broadly classified as "supervised learning", "unsupervised learning" or "reinforcement learning". Further, there is a technique referred to as "deep learning" that learns extraction of a feature value per se in order to realize these techniques.

"Supervised learning" is a model which provides a large quantity of data sets of some input and results (labels) to a learning apparatus to learn features in the data sets and infer the results from the input, wherein a relationship can be recursively acquired. In the present embodiment, it can be used in a part for calculating the arrangement positions of the magnets on the core. It can be realized using an algorithm such as neural network described hereinafter.

"Unsupervised learning" is a technique which provides a large quantity of input data alone to a learning apparatus to learn how the input data is distributed and to learn a device that performs compression, sorting, shaping or the like with respect to the input data without providing corresponding teacher output data. Similar features in the data sets can be clustered. It is possible to achieve prediction of output using this result and by performing allocation of output such that some criteria is provided the result is optimized. Further, as problem setting intermediate between "unsupervised learning" and "supervised learning", there is one referred to as "semi-supervised learning", which corresponds to a case in which only in some there is a set of data of input and output and in the remainder there is data of input alone. In the present embodiment, it is possible to use, in unsupervised learning, data that can be acquired without actually operating the rotor design apparatus and perform learning efficiently.

A problem of reinforcement learning is set as follows.

The rotor design apparatus observes a state of environment and determines action.

Environment changes according to some rule, and further, one's own action may change the environment.

A reward signal returns each time action is performed.

It is the sum of reward (discount) over the future that is desired to be maximized.

Learning starts from a state in which the result caused by action is not known or only incompletely known. The rotor design apparatus can acquire the result as data only after it actually operates. In other words, it is preferable to explore the optimum action by trial and error.

With a state in which prior learning (a technique such as the above-described supervised learning or inverse reinforcement learning) is performed to mimic a human movement as the initial state, learning may be started from a good starting point.

"Reinforcement learning" is a method for learning appropriate action based on the interaction provided by action to environment not only by determination or sorting but also by learning action, i.e., for learning to maximize the reward obtained in future. This indicates that in the present embodiment, action such as affecting the future can be acquired. For example, description is continued with respect to the case of Q-learning, but there is no limitation thereto.

Q-learning is a method for learning a value $Q(s, a)$ that selects action a in some environmental state s. In other words, when there is some state s, the highest action a of the value $Q(s,a)$ may be selected as the optimum action. However, first, the correct value for the value $Q(s, a)$ is completely not known for a combination of the state s and the action a. Accordingly, an agent (action subject) selects various actions under some state s and is given a reward for the action a at that time. In this case, the agent selects a better action, i.e., proceeds to learn the correction value $Q(s, a)$.

As a result of action, it is desired to maximize the sum of the reward obtained in future, and finally, it is aimed to make Q(s, a)=E[Σγ$^t$r$_t$] (the expected value is taken for the case when the state varies in accordance with the optimum action. Needless to say, since it is not known, it is preferable to learn while making exploration). An update formula for such value Q(s, a) can, for example, be represented by equation (1) as follows:

$$Q(s_t, a_t) \leftarrow Q(s_t, a_t) + \alpha \left( r_{t+1} + \gamma \max_a Q(s_{t+1}, a) - Q(s_t, a_t) \right) \quad (1)$$

In the above equation, $s_t$ represents a state of the environment at a time t, and $a_t$ represents an action at the time t. The action $a_t$ changes the state to $s_{t+1}$. $r_{t+1}$ represents a reward that can be gained via the change of the state. Further, the term with max is the Q-value multiplied by γ for the case where the action a for the highest Q-value known at that time is selected under the state $s_{t+1}$. γ is a parameter of 0<γ≤1, and referred to as discount rate. α is a learning factor, which is in the range of 0<α≤1.

Equation (1) represents a method for updating the evaluation value $Q(s_t, a_t)$ of the action $a_t$ in the state $s_t$ on the basis of the reward $r_{t+1}$ has returned as a result of the action $a_t$. It indicates that when the evaluation value $Q(s_{t+1}, \max a_{t+1})$ of the best action max a in the next state based on reward $r_{t+1}$+action a is larger than the evaluation value $Q(s_t, a_t)$ of the action a in the state s, $Q(s_t, a_t)$ is increased, whereas when smaller, $Q(s_t, a_t)$ is also decreased. In other words, it is configured such that the value of some action in some state is made to be closer to the reward that instantly come backs as a result and to the value of the best action in the next state based on that action.

Methods of representing Q(s, a) on a computer includes a method in which the value is retained as a table (action value table) for all state-action pairs (s, a) and a method in which a function approximate to Q(s, a) is prepared. In the latter method, the above-described update formula can be implemented by adjusting parameters of the approximation function by a technique, such as stochastic gradient descent method. The approximation function may use a neural network described hereinafter.

Figure 9:
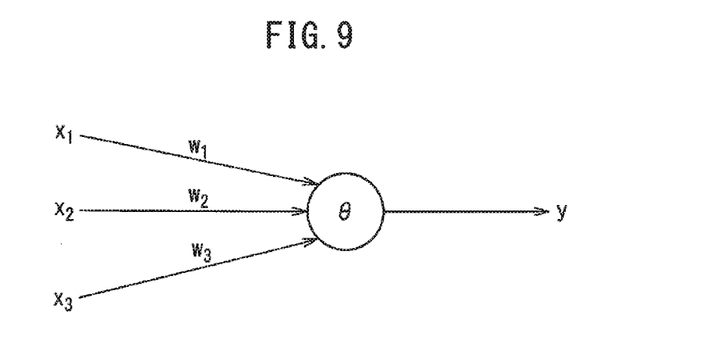
FIG. 9 is a schematic diagram illustrating a model of a neuron.

As an approximation algorithm for the value function in supervised learning, unsupervised learning and reinforcement learning, use may be made of a neural network. The neural network is configured, for example, of an arithmetic unit, a memory, or the like that implements a neural network imitating a model of neuron such as illustrated in FIG. 9. FIG. 9 is a schematic diagram illustrating the model of neuron.

As illustrated in FIG. 9, the neuron outputs an output y for a plurality of inputs x (by way of example herein, input x1 to input x3). Each of the inputs x1 to x3 is multiplied by a weight w (w1 to w3) corresponding to the input x. In this case, the neuron outputs the output y represented by equation (2). The input x, the output y, and the weight w all are vectors.

$$y = f_K(\Sigma_{i=1}^n x_i w_i - \theta)$$

where θ is a bias, and $f_k$ is an activation function.

Subsequently, referring to FIG. 10, a description will be given of a neural network having three-layer weights, which is a combination of the above-described neurons. FIG. 10 is a schematic diagram illustrating a neural network having three-layer weights of D1 to D3.

As illustrated in FIG. 10, a plurality of inputs x (by way of example herein, input x1 to input x3) are inputted from the left hand side of the neural network, and a result y (by way of example herein, result y1 to result y3) is outputted from the right hand side.

Specifically, the input x1 to input x3 are multiplied by a corresponding weight and inputted to each of the three neurons N11 to N13. The weights applied to these inputs are collectively indicated by w1.

The neurons N11 to N13 output z11 to z13, respectively. z11 to z13 are collectively represented as a feature vector z1, and can be regarded as a vector from which the feature value of the input vector is extracted. The feature vector z1 is a feature vector between the weight w1 and the weight w2.

z11 to z13 with a corresponding weight are multiplied by a corresponding weight and inputted to each of the two neurons N21 and N22. The weights applied to these feature vectors are collectively represented as w2.

The neurons N21 and N22 output z21 and z22, respectively, which are collectively represented as a feature vector z2. The feature vector z2 is a feature vector between the weight w2 and the weight w3.

The feature vectors z21 and z22 are multiplied by a corresponding weight and inputted to each of the three neurons N31 to N33. The weights multiplied to these feature vectors are collectively represented as w3.

Finally, the neurons N31 to N33 output result y1 to result y3, respectively.

The operation of the neural network includes a learning mode and a value prediction mode; in the learning mode, the weight w is learned using a learning data set, and in the prediction mode, the action decision of the rotor design apparatus is performed using the parameters (reference is made to prediction for convenience, but various tasks such as detection, classification, inference, or the like are possible).

It is possible that the rotor design apparatus can be actually operated in the prediction mode to instantly learn and cause the resulting data to be reflected in the subsequent action (on-line learning) and also that a group of pre-collected data can used to perform collective learning and implement a detection mode with the parameter subsequently for quite a while (batch learning). An intermediate case is also possible, where a learning mode is introduced each time data is accumulated to a certain degree.

The weights w1 to w3 can be learned by an error back propagation method. The error information enters from the right hand side and flows to the left hand side. The error back propagation method is a technique for adjusting (leaning) each weight so as to minimize the difference between an output y when an input x is inputted and a true output y (teacher) for each neuron.

Such a neural network can further increase the layers to three or more (referred to as deep learning). It is possible to perform feature extraction of input step by step and automatically acquire an arithmetic unit, which regresses the results, from the teacher data alone.

Accordingly, in order to perform Q-learning described above, the machine learning apparatus 1 according to the present embodiment includes the state observation unit 11, the learning unit 12, and the decision-making unit 13, for example, as illustrated in FIG. 4. However, the machine learning method applied to the present invention is by no means limited to Q-learning. For example, when supervised learning is applied, the value function corresponds to a learning model, and the reward corresponds to an error. It is possible to use an approximate function using the above-described neural network as the action value table, and this is particularly effective when the quantity of information of s and a is huge like image data or the like.

The above-described state observation unit 11, learning unit 12, decision-making unit 13, and cogging torque calculation unit 15 may be constructed, for example, in the form of a software program or alternatively as a combination of various electronic circuits and a software program. For example, when they are constructed in the form of a software program, the function of each of the units described above is realized by operating an arithmetic processing unit located in a computer in accordance with the software program. Alternatively, the machine learning apparatus 1 including the state observation unit 11 and the learning unit 12 may be implemented as a semiconductor integrated circuit in which a software program that realizes the function of each unit is written. Further, alternatively, a semiconductor integrated circuit in which a software program that realizes the function of each unit may be implemented in a form that includes not only the machine learning apparatus 1 including the state observation unit 11 and the learning unit 12 but also the decision-making unit 13 or in a form that includes the state observation unit 11, the learning unit 12, the decision-making unit 13 and the cogging torque calculation unit 15.

According to the present invention, it is possible to realize a machine learning unit and method capable of easily determining optimum arrangement positions of magnets on a core of a motor rotor, and a rotor design apparatus including the machine learning apparatus.

According to the present invention, the machine learning apparatus proceeds to learn and adjust by itself the arrangement positions (arrangement) of the magnets for which the magnitude of cogging torque generated by the magnets arranged on the core is minimized and the smoothness of feed is optimized, so that the time required to design the rotor is reduced, thereby making it possible to lessen the burden on the operator.

According to a modified embodiment of the present invention, when a plurality of rotors are manufactured using the numerous in-stock magnets, variations in the magnitude of cogging torque of a rotor due to differences in the production lot can be suppressed, and as a whole, the magnitude of the cogging torque can be reduced, so that economic performance is improved.

What is claimed is:

1. A machine learning apparatus that learns a condition associated with an arrangement position of a magnet on a core of a motor rotor, the machine learning apparatus comprising:
    a state observation unit that observes a state variable composed of data relating to arrangement positions of a plurality of magnets arranged on the core, data relating a magnitude of a cogging torque generated when the plurality of magnets are arranged at the respective arrangement positions, and data relating to a magnetic flux density of each of the magnets; and
    a learning unit that learns the condition associated with arrangement positions of the magnets on the core in accordance with a training data set constituted by the state variable.

2. The machine learning according to claim 1, wherein the learning unit comprises:
    a reward calculation unit that calculates a reward based on the magnitude of the cogging torque generated when the plurality of magnets are arranged at certain arrangement positions on the core; and
    a function update unit that updates a function for calculating the arrangement positions of the magnets on the core based on the state variable and the reward.

3. The machine learning apparatus according to claim 2, wherein the reward calculation unit increases the reward when the magnitude of the cogging torque generated when the plurality of magnets are arranged at certain arrangement positions on the core is smaller than a magnitude of cogging torque observed by the state observation unit before the magnitude of the current cogging torque, and reduces the reward when larger.

4. The machine learning apparatus according to claim 2, wherein the reward calculation unit increases the reward when the magnitude of the cogging torque generated when the plurality of magnets are arranged at certain arrangement positions on the core is inside a specified range, and reduces the reward when the magnitude of the cogging torque is outside the specified range.

5. The machine learning apparatus according to claim 2, wherein the function update unit updates the function for calculating the arrangement positions of the magnets on the core based on the state variable and the reward and in accordance with a neural network model.

6. The machine learning apparatus according to claim 1, wherein the learning unit is configured to learn the condition in accordance with the training data set created with respect to a plurality of rotors.

7. A rotor design apparatus comprising the machine learning apparatus according to claim 1, comprising:
    an input unit to which the data relating to the magnetic flux density of each of the magnets is inputted;
    a cogging torque calculation unit that calculates a magnitude of cogging torque generated when the plurality of magnets are arranged at certain arrangement positions on the core based on the data relating to the magnetic flux density of each magnet inputted via the input unit;
    a decision-making unit that determines the arrangement positions of the magnets on the core based on a result learned by the learning unit in accordance with the training data set and in response to input of the current state variable; and
    a notification unit that notifies the arrangement positions of the magnets determined by the decision-making unit.

8. The rotor design apparatus according to claim 7, further comprising a data storage unit that stores data relating to the magnetic flux densities of the in-stock magnets which exist more than the number of the magnets used to assemble a certain rotor,
    wherein the decision-making unit determines such a combination and arrangement positions of magnets used to configure each rotor that the magnitudes of cogging torques generated by the magnets arranged on the core from among the in-stock magnets become minimum with respect to the respective rotors, based on a result learned by the learning unit in accordance with the training data set comprising data relating to the magnetic flux densities of the in-stock magnets stored in the data storage unit, and
    wherein the notification unit notifies the combination and arrangement positions of the magnets determined by the decision-making unit.

9. A machine learning method for learning a condition associated with an arrangement position of a magnet on a core of a motor rotor, the machine learning method comprising:

a state observation step that observes a state variable composed of data relating to arrangement positions of a plurality of magnets arranged on the core, data relating to a magnitude of cogging torque generated when the plurality of magnets are arranged at the respective arrangement positions, and data relating to the magnetic flux density of each magnet; and a learning step that learns the condition associated with the arrangement positions of the magnets on the core in accordance with a training data set constituted by the state variable.

\* \* \* \* \*